US005706467A

United States Patent [19]
Vishlitzky et al.

[11] Patent Number: 5,706,467
[45] Date of Patent: Jan. 6, 1998

[54] SEQUENTIAL CACHE MANAGEMENT SYSTEM UTILIZING THE ESTABLISHMENT OF A MICROCACHE AND MANAGING THE CONTENTS OF SUCH ACCORDING TO A THRESHOLD COMPARISON

[75] Inventors: Natan Vishlitzky, Brookline; Yuval Ofek, Hopkinton, both of Mass.

[73] Assignee: EMC Corporation, Hopkinton, Mass.

[21] Appl. No.: 523,305

[22] Filed: Sep. 5, 1995

[51] Int. Cl.$^6$ .................................................. G06F 13/00
[52] U.S. Cl. .................. 395/456; 395/445; 395/446; 395/460; 395/463; 395/486; 364/DIG. 1
[58] Field of Search ........................ 395/446, 460, 395/463, 486, 445, 456

[56] References Cited

U.S. PATENT DOCUMENTS

| | | | |
|---|---|---|---|
| 4,969,088 | 11/1990 | McAuliffe et al. | 395/200.03 |
| 5,276,832 | 1/1994 | Holman, Jr. | 395/403 |
| 5,305,389 | 4/1994 | Palmer | 382/305 |
| 5,353,430 | 10/1994 | Lautzenheiser | 395/444 |
| 5,440,686 | 8/1995 | Dahman et al. | 395/164 |
| 5,465,342 | 11/1995 | Walsh | 395/446 |
| 5,513,336 | 4/1996 | Vishlitzky et al. | 395/463 |

*Primary Examiner*—Frank J. Asta
*Attorney, Agent, or Firm*—Wolf, Greenfield & Sacks, P.C.

[57] ABSTRACT

A shared system memory buffers data transfers between a plurality of host computers and a plurality of data storage devices. Management of the system memory includes establishing a replacement queue to facilitate performance. When a sequential operation is to be performed, the average fall through time of the data elements in the replacement queue is compared to a constant to determine the stress on the cache. If the cache is stressed, cache management establishes a microcache within the replacement cache. The microcache is used to stage data elements for the sequential operations and replaces data elements on a least recently used basis.

10 Claims, 13 Drawing Sheets

SEQUENTIAL CACHE MANAGEMENT SYSTEM UTILIZING THE ESTABLISHMENT OF A MICROCACHE AND MANAGING THE CONTENTS OF SUCH ACCORDING TO A THRESHOLD COMPARISON

BACKGROUND OF THE INVENTION

1. Field of the Invention

The present invention relates generally to digital computer systems, and more particularly to management of cache memory in a data storage system.

2. Background Art

Cache memory is used in data storage systems so that under typical conditions, a relatively large and slow main memory can be accessed at a relatively high rate. The cache memory is a relatively small high-speed memory that can store at any given time a portion of the data stored in the main memory. The data storage system also includes a cache directory or index of the data elements. The cache directory is referenced to provide an indication of whether or not each data element is located in the cache memory at any given time, and if so, the present location of the data element in the cache memory.

A data storage system is typically responsive to data access requests from a host computer. The data access requests, for example, include read and write requests. When a data storage system having a cache memory receives a request for access to data, the cache directory is inspected to determine whether the data element to be accessed resides in the cache memory. If so, the data storage system accesses the data in the cache memory. If not, the data storage system accesses the data in the main memory, and if the accessed data is likely to be accessed again in the near future, the accessed data is copied or "staged" into the cache memory.

In some data storage systems, data elements to be accessed are always staged into the cache memory if they are absent from the cache memory. Some data storage systems are also responsive to explicit "prefetch" commands from the host computer to cause specified data to be staged into the cache, even though the specified data is not immediately accessed by the host computer.

Because the cache memory has a capacity that is smaller than the main memory, it is sometimes necessary for data elements in the cache memory to be replaced or removed from the cache memory in order to provide space in the cache memory for receiving data elements to be staged into the cache memory. In general, for the cache memory to be useful, the data elements replaced or removed from the cache memory must be less likely to be accessed in the near future than the data elements that are staged into the cache memory.

Data storage systems that use disc drives for the main memory typically use random access memory (RAM) for the cache memory. In such a data storage system, the data elements in the cache memory are often logical tracks of data on the discs, although in many systems, the data elements are blocks or records of data. Each data element can be stored in any one of a multiplicity of blocks or slots in the cache memory. The cache directory includes a directory entry for at least each data element stored in the cache. Each directory entry for each data element stored in the cache memory includes a pointer to the location of the data element in the cache memory. The cache directory can be a table including an entry for each data element stored in the disc storage. Alternatively, the directory may include a hash table for accessing lists of the directory entries so that the cache directory need not include any cache directory entries for data elements that are absent from the cache memory. In either case, any one of a plurality of data elements in the cache memory can be replaced or removed from cache to make room for another data element to be staged into the cache memory. The performance of such a data storage system is highly dependent on the cache management strategy used for selecting the data element to be removed or replaced. This strategy is implemented by a cache management system, or "cache manager," in the data storage system.

Typically the cache manager will remove or replace the "least-recently-used" data element in the cache memory. The "least-recently-used" data element is the usually the oldest data element accessed by a host computer. So that the cache manager can readily identify the least-recently-used data element, the cache manager maintains a list or queue of the data elements in the cache memory. The queue is typically implemented as a doubly-linked list. "Forward" and "backward" pointers for this doubly-linked list, for example, are in the cache directory entries, or in the blocks or slots in the cache. When a data element is accessed, the data element is moved to the tail of the queue unless the data element is already at the tail of the queue. If the data element is already in the cache but it is not already at the tail of the queue, it is removed from the queue before being inserted at the tail of the queue. In this fashion, so long as the queue is not empty, the least-recently-used data element in the cache memory will be at the head of the queue, and the most-recently-used data element in the cache memory will be at the tail of the queue.

Various techniques have been described for dynamically monitoring and adjusting cache management parameters. For example, Yanai et al. U.S. Pat. No. 5,381,539, issued Jan. 10, 1995, incorporated herein by reference, describes a data storage system having a cache controlled by parameters including: (a) a minimum number of data storage elements which must be retrieved and stored in cache memory and used by the system before the cache manager recognizes a sequential data access in progress; (b) a maximum number of data elements which the cache manager is to prefetch ahead; and (c) a maximum number of sequential data elements to be stored in cache before the cache memory locations containing the prefetched data elements are reused or recycled. The cache manager scans or monitors the cache directory and uses the sequential access threshold (a) and time stamps associated with the data elements in the cache to recognize the occurrence of a sequential data access in progress by a given process executing on a host computer. Once a sequential access is recognized, the cache manager prefetches ahead up to the maximum number (b) of sequential data elements. The prefetched sequential data elements are stored in the cache memory loop, but they are further identified as forming a micro-cache which is reused by the sequential process, and which has the maximum number (c) of sequential data elements to be stored in cache before the cache memory locations containing the prefetched data elements are reused or recycled. The re-using of the cache memory locations in the micro-cache prevents the sequential process from flushing data elements from other processes from the cache memory loop. The cache manager continues to monitor data use by the sequential process, and when the end of a sequential data access by the process is detected by non-use of a data element stored in the microcache, the cache manager will no longer re-use the cache memory locations of the microcache for the process, and will de-allocate any resources used for managing the micro-cache. The cache manager also dynamically adjusts the sequential access detection threshold (a) and the maximum number of data elements to prefetch (b). The cache directory includes, for each data element, a flag or bit that is reset when the data element is fetched from storage and staged into the cache, and that is set when the data element is accessed by the host. The cache manager monitors this flag to detect data elements that are prefetched but not used as anticipated by each process. When the cache manager detects many data elements that are prefetched but not used, the cache manager increases the sequential access detection threshold (a). Moreover, when the cache manager detects a large number or long continuous string of used data elements, the cache manager decreases the sequential access detection threshold (a). In this fashion, the sequential detection threshold "floats" at an optimum level for each process. The cache manager also monitors and dynamically adjusts the number of data elements to be prefetched (b) as a monitors and dynamically adjusts the number of data elements to be prefetched (b) as a function of the number of sequential data elements which have been accessed by a host. Further, the cache manager dynamically adjusts the size of the micro-cache (c) for each process in response to a corresponding increase or decrease in the number of data elements to be prefetched (b) for the process.

In the prior art, sequential prefetch operations resulted in a microcache as described above being established. Creating this additional burden on the cache manager for all situations is not desirable. What is needed is an optional microcache which is only utilized when it makes the overall cache more efficient.

SUMMARY OF THE INVENTION

The present invention provides a system memory having a replacement queue which includes a microcache for selected sequential operations. If the replacement queue is stressed as determined by the average fall through time of the data elements in the replacement queue compared to a predetermined threshold, then the microcache is used for staging all accesses identified by the sequential operation. If the replacement queue is not stressed then the normal operation of the replacement queue continues and the microcache method of cache management is not used. The microcache uses a least recently used replacement procedure for the data elements it stores.

BRIEF DESCRIPTION OF THE DRAWINGS

Other objects and advantages of the invention will become apparent upon reading the following detailed description with reference to the accompanying drawings wherein.

Figure 1:
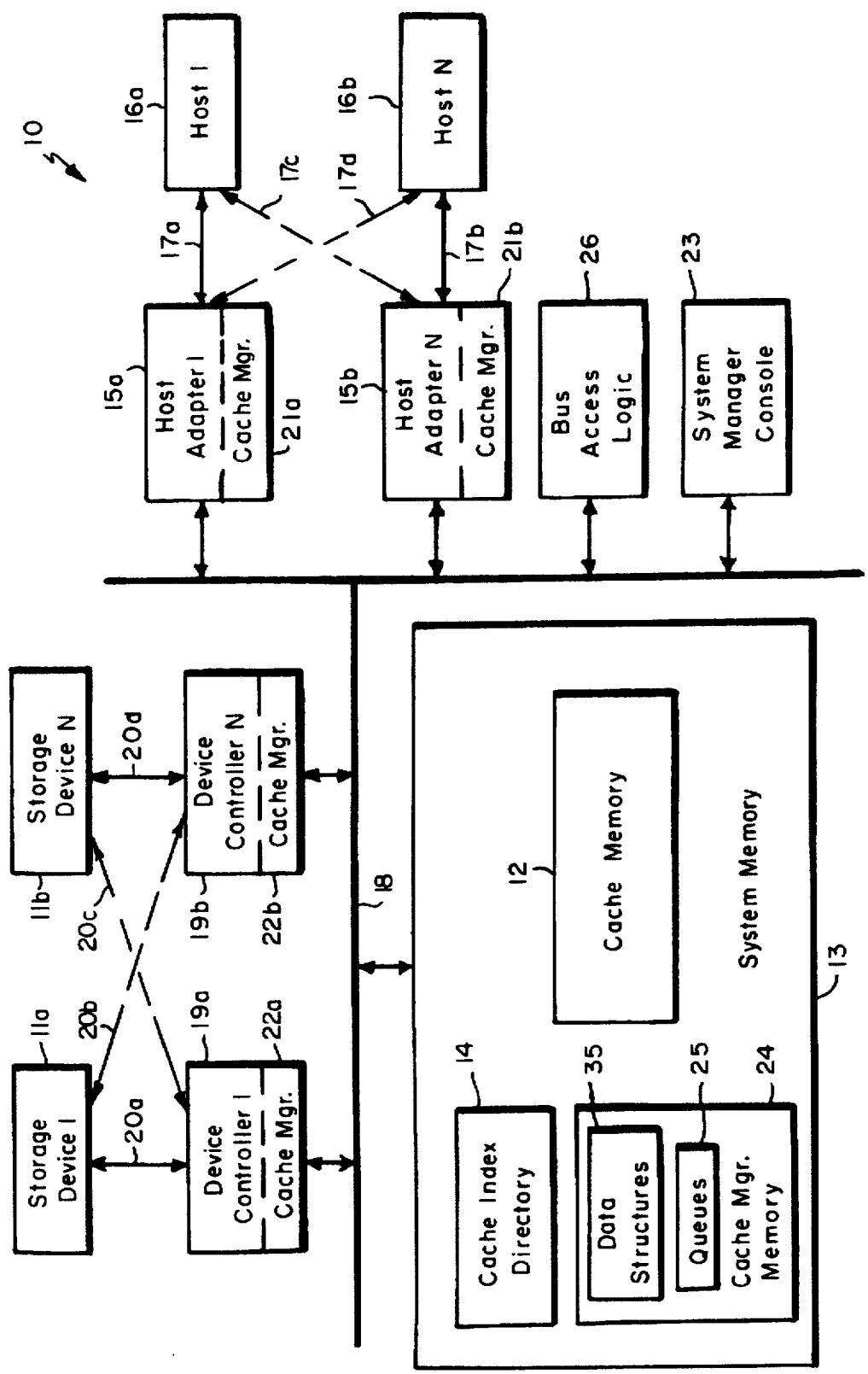
FIG. 1 is a block diagram of a multi-processor data storage system employing the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

1. The Architecture of the Preferred Data Storage System

Turning now to FIG. 1 of the drawings, there is shown a block diagram of a preferred embodiment of a data storage system employing the present invention. The data storage system 10 includes a number of data storage devices 11a, 11b and a cache memory 12.

Preferably the data storage devices 11a, 11b are disk storage devices, each of which may include one or more disk drives, dependent upon the user's requirements and system configuration. However, the data storage system 10 may use other kinds of storage devices, including but not limited to optical disks, CD ROMS and magnetic tape devices.

The cache memory 12 is part of a system memory 13. Preferably the system memory 13 is a high-speed random-access semiconductor memory. The system memory 13 also includes a cache index directory 14 which provides an indication of the data which is stored in the cache memory 12 and provides the addresses of the data which is stored in the cache memory. In a preferred embodiment, the cache index directory is organized as a hierarchy of tables for devices, cylinders, and tracks of data records, as further described in Yanai et at., U.S. Pat. No. 5,206,939, issued Apr. 27, 1993, and incorporated herein by reference.

The availability of access to the data in the data storage system 10 is enhanced by employing multiple processors 15a, 15b in the system for interfacing the system to one or more host computers 16a, 16b via a plurality of data access channels 17a, 17b, 17c, 17d. Each of these processors 15a, 15b that function as a host adapter, for example, provides an interface to a separate and distinct group of the host channels 17a, 17b, 17c, 17d. For enhanced reliability, however, each host typically is provided with a data access channel to more than one of the host adapters. The host adapters 15a, 15b can access the system memory 13 via a high-speed, parallel-line system bus 18.

To enhance data access availability to the data in the storage devices 11a, 11b, additional processors 19a, 19b are typically used for controlling data access to the storage devices. Each of these additional processors 19a, 19b that functions as a device controller, for example, controls data access to a group of the data storage devices 11a, 11b. For enhanced reliability, each data storage device 11a, 11b has two ports, each of which is interfaced to a different one of the device controllers 19a, 19b over a respective one of a number of channels 20a, 20b, 20c, and 20d.

The bus 18 is preferably the backplane of a printed-circuit card-cage or main-frame in cabinet, and each of the host adapters 15a, 15b and device controllers 19a, 19b is constructed on a printed circuit board that is mounted in the card-cage or main-frame in the cabinet. For redundancy purposes, bus 18 may also be a pair of buses where a first bus is connected to a first set of host adapters 15 and a first set of device controllers 19 with a second bus connected to a second set of host adapters 15 and a second set of device controllers 19. Both buses are connected to system memory 13 and can operate concurrently.

The system memory 13 is constructed on a number of additional printed circuit boards that are mounted in the card-cage or main-frame. The system memory includes a plurality of memory boards coupled to bus 18 or alternatively to buses 18. While multiple memory boards can support concurrent operations, only one memory board can be accessed at one time by a host adapter or device controller. System memory 13 may also include a region of memory known as permacache memory. As is well known, data elements remain in permacache memory unless they are specifically deleted. The data storage system further includes a system manager console 23 including an additional processor on an additional printed circuit board. The system manager console 23 permits a system operator to run set-up and diagnostic programs for control and monitoring of the performance of the data storage system 10.

To provide reliable access by any host 16a, 16b over any host channel 17a, 17b, 17c, 17d to any of the data stored in the data storage devices 11a, 11b, it is necessary to coordinate each of the host adapters 15a, 15b, with each of the device controllers 19a, 19b. To simplify this coordination, it is desirable to use the system memory 13 and in particular the cache memory 12 as a buffer for data transfer between each host adapter and each device controller. Such a system, for example, is described in Yanai et al., U.S. Pat. No. 5,206,939, issued Apr. 27, 1993, and incorporated herein by reference. In such a system, it is not necessary to provide a processor dedicated to managing the cache memory 12. Instead, each of the host adapters or device controllers executes a respective cache manager program 21a, 21b, 22a, 22b. Each of the cache manager programs access the cache memory 12, cache index directory 14, and cache manager memory 24. The cache manager memory 24 includes a queue 25 and a data structure 35 for storing pending write operations which will be further described below with reference to FIG. 2.

The cache manager programs 21a, 21b of the host adapters 15a, 15b write data from the hosts 16a, 16b into the cache memory 12 and update the cache index directory 14 and the cache manager memory 24. The cache manager programs 21a, 21b of the host adapters 15a, 15b also access the cache index directory 14 and read data from the cache memory 12 for transmission to the hosts 16a, 16b. The cache manager programs 21a, 21b of the host adapters 15a, 15b will be further described below with reference to FIGS. 4 and 5.

The cache manager programs 22a, 22b of the device controllers 19a, 19b stage data from the storage devices 11a, 11b to the cache memory 12 and update the cache index directory 14 and the cache manager memory 24. The cache manager programs 22a, 22b of the device controllers 19a, 19b also de-stage or write-back data from the cache memory 12 to the storage devices 11a, 11b and update the cache index directory 14. The cache manager programs of the device controllers 19a, 19b will be further described below with reference to FIGS. 6 and 7.

Before accessing the system memory 13, each host adapter 15a, 15b and device controller 19a, 19b must obtain access to the bus 18 and the shared system memory 13. Moreover, to ensure that all of the processors have an equal opportunity to access the shared system memory, access is granted to another processor in a round-robin fashion in the event that more than one of the other processors is seeking access at the time that a processor relinquishes its access. This arbitration of access requests is performed by conventional bus access logic 26 that receives access request signals from the processors linked to the bus 18, and provides grant signals to the processors. The bus access logic 26 asserts a grant signal to only one processor at any given time to grant access to the bus 18. The grant signals, for example, are the decoded outputs of a counter that is inhibited from counting by an AND-OR logic gate when the request signal from any processor is coincident with the grant signal to that same processor. However, a wide variety of arbitration schemes are known in the art that are suitable for use in a data storage system employing multiple processors and a shared system memory.

Figure 2:
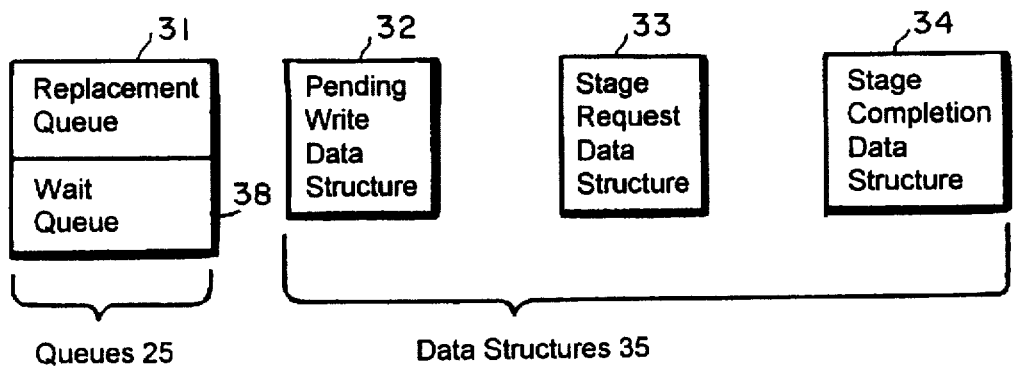
FIG. 2 is a schematic diagram of various queues used for cache management in the data storage system of FIG. 1.

Turning now to FIG. 2, there is shown queues 25 which are formed from a region of memory in system memory 13. Within queues 25 there is a wait queue 38 and a "replacement" queue 31 which is analogous to the "least recently used" (LRU) queue used in prior-art cache managers for readily identifying the least-recently-used data element in the cache. When one of the device controllers 19a, 19b is about to stage a data element into the cache memory 12 for a non-sequential process, the device controller inspects the head of the queue 31 to select the slot of the cache memory (12 in FIG. 1) into which the data element is written, and this cache slot is then placed at the tail of the queue 31. As further described below, however, the cache slot at the head of the queue 31 does not necessarily contain the least-recently-used cache data element, and therefore the queue 31 will be referred to more generally as the "replacement queue" instead of the "LRU queue".

System memory also includes a fixed region for storing data structures 35. A pending write data structure 32 lists cache slots that have been written to but not yet written back to a storage device. Because of delays which may occur, the write pending slots are organized as a tree structure. If a cache slot is in a pending write data structure 32, then it should not be in the replacement queue 31; otherwise, the modified data in the cache slot might be written-over and lost before it is written back to a storage device. The pending write data structure is accessed by the device controllers 19a, 19b for performing the "de-stage" tasks of writing modified data from the cache memory to the storage devices. For this reason, it is desirable to provide a separate pending write data structure 32 for each of the storage devices, so that each device controller need access only the pending write data structure for the storage devices it services.

When a host adapter is responding to a data access command from a host and finds that the data element requested by the host is absent from the cache memory 12, the host adapter inserts a stage request message into a stage request data structure 33. In the preferred embodiment, it is desirable to minimize the movement of the heads in the storage device. Thus, selection of the closest data element to the current head position occurs as is well known in the art. All stage request messages are polled prior to to making this selection. Once the appropriate data element is selected, the access operation is completed and a stage completion message is inserted into a stage completion data structure 34.

An alternative embodiment to polling is to send an attention or interrupt signal to the device controller or controllers controlling the storage device from which the data element can be fetched. The stage request message includes the address of the data element in the storage device and the cache memory address allocated to the data element.

When a device controller responds to the attention or interrupt signal, it removes the stage request message from the head of the stage request data structure 33 to determine the data element to be fetched, and once the data element has been fetched and written into the cache memory 12, the device controller places a stage completion message into the stage completion data structure 34 and sends an attention or interrupt signal to the host adapter 15. The stage completion message identifies the data element that has been staged. In response to the attention or interrupt signal, the host adapter removes the stage completion message from the stage completion queue 34, and completes the data access operation by accessing the data element having been staged in the cache memory 12.

In both the polling and interrupt schemes, the original host adapter which staged the request does not need to be the host adapter which receives the message from the device controller since the host will ensure that data path reconnects (DPR) are recognized by the other host adapters.

Each stage completion message is sent to a particular one of the host adapters that requested the stage operation. For this reason it is desirable to have a separate stage completion data structure for each of the host adapters.

Figure 3:
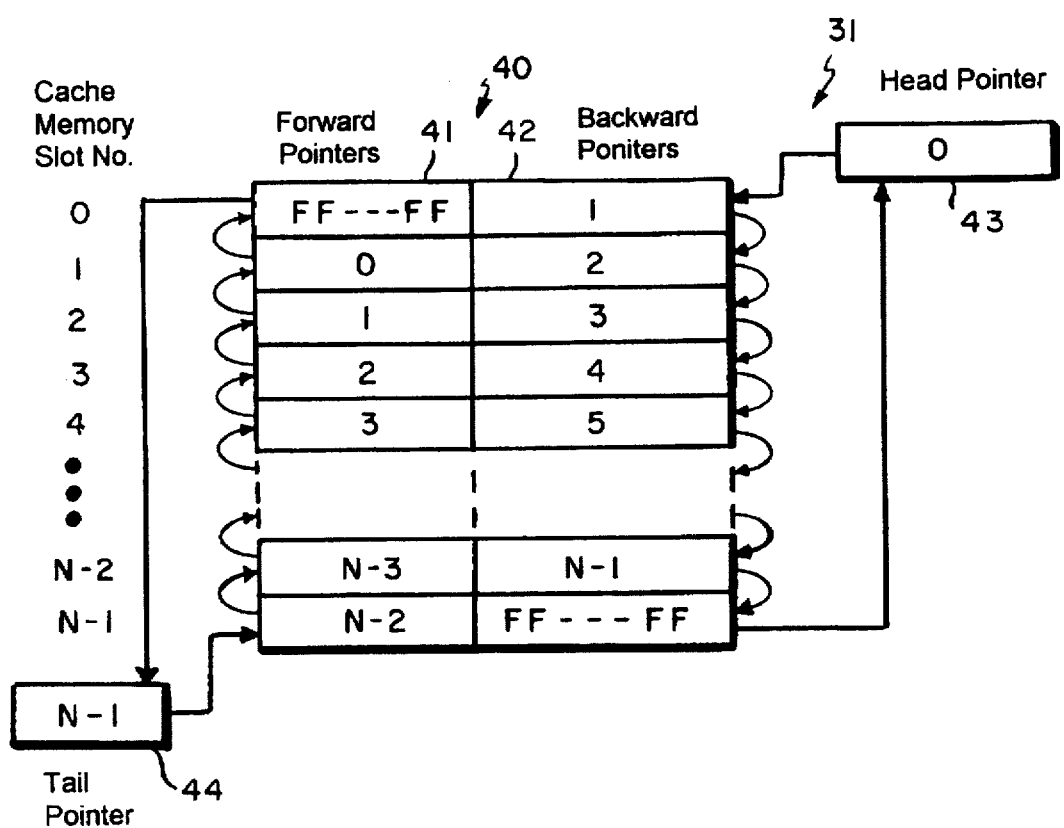
FIG. 3 is a schematic diagram of a replacement queue used for cache management in the data storage system of FIG. 1.

Turning now to FIG. 3, there is shown a specific embodiment of the replacement queue 31. In this example, the replacement queue 31 is a doubly-linked list of entries, each entry including a forward pointer and a backward pointer. The entries are rows in a table 40 having a respective row for each slot in the cache memory, a first column 41 containing the forward pointers, and a second column 42 containing the backward pointers. Any entries in this table 40 that are not in the replacement queue 31 correspond to cache memory slots having stage or de-stage pending or in progress. As shown in FIG. 3, all of the entries in the table 40 are in the replacement queue 31. The replacement queue is initialized to such a state when the storage system is installed and the cache memory 12 is empty.

The replacement queue 31 includes a head pointer 43, which points to the entry in the table 40 for the cache memory slot at the head of the queue. For any entry except the entry at the head of the queue, the forward pointer points to the next entry toward the head of the queue. The replacement queue 31 also has a tail pointer 44 which, points to the tail of the queue. For any entry except the entry at the tail of the queue, the backward pointer points to the next entry toward the tail of the queue.

The pending write data structure 32, the stage request data structure 33, and the stage completion data structure 34 are not linked lists in the preferred embodiment. Each of these data structures occupy a region of shared memory and are ordered by the memory addresses of the entries.

Figure 4:
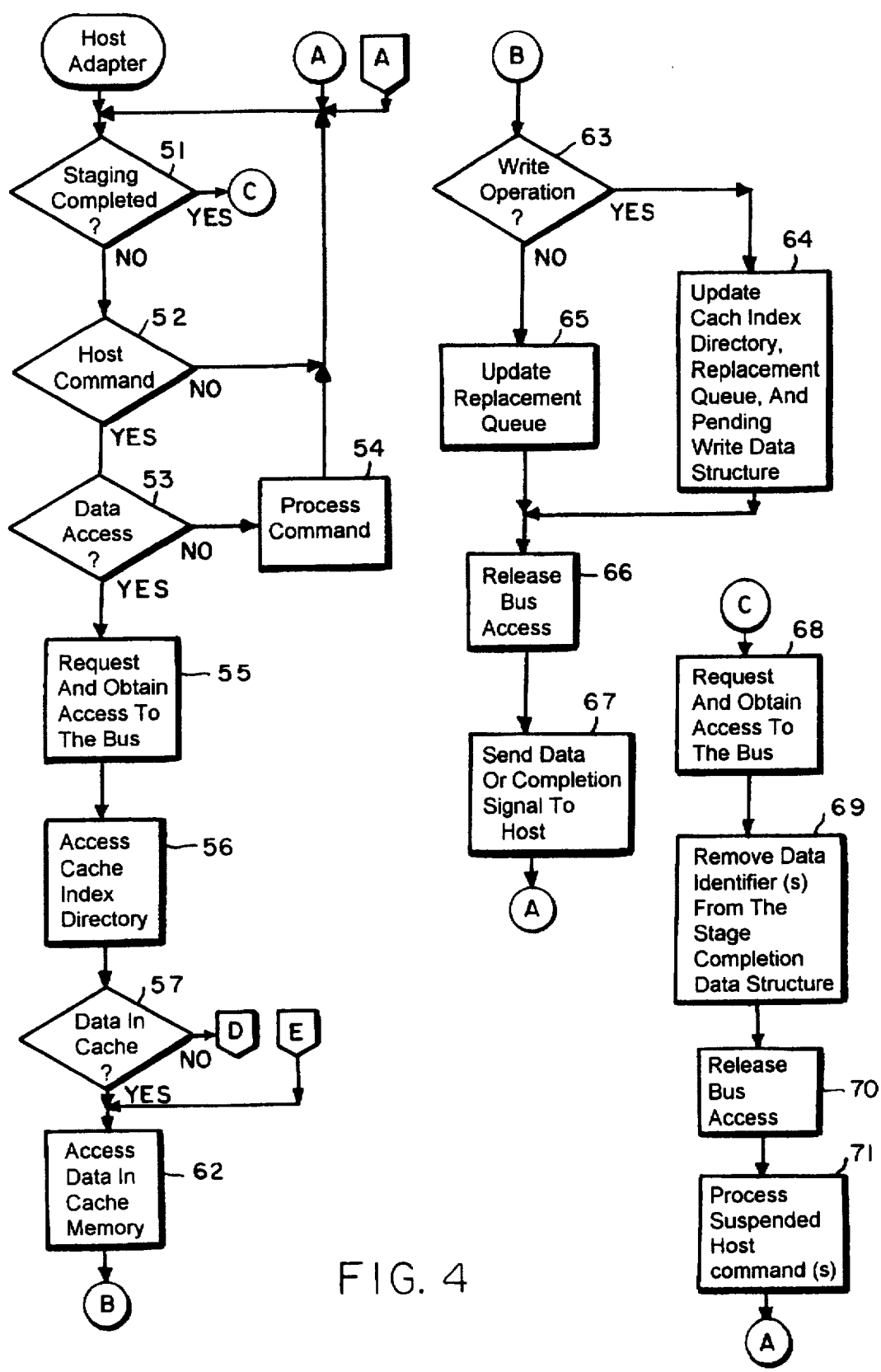
FIG. 4 is a first portion of a flowchart of a cache management procedure executed by each host adapter in the data storage system of FIG. 1.

Turning now to FIG. 4, there is shown a flowchart of the cache manager program 21a, 21b for each of the host adapters 15a, 15b. A host adapter has two main tasks. The host adapter is either processing a new host command, or it is completing the processing for an old host command for which processing was suspended pending a stage operation. Completion of an old host command has priority once the required staging operation has been completed. Therefore, in the first step 51, execution branches to complete an old host command if the host adapter, for example, has received an attention or interrupt signal from a device controller signaling the completion of a stage operation for the host adapter. Otherwise, execution continues to step 52 where the host adapter checks an input command buffer (not shown) to determine whether the host has received a command from one of the host computers 16a, 16b. If not, execution loops back to step 51. If so, execution continues to step 53.

In step 53, execution branches depending on whether the host command is a data access command that requires access to the cache memory 12. Such data access commands, for example, includes read and write commands. A host adapter may receive other host commands, such as prefetch commands.

If the channel command is not a data access command, then the execution branches to step 54 to process the command. Once the host command is processed in step 54, execution branches back to step 51.

In step 55, the host adapter begins to process a data access command by requesting and obtaining access to the system bus (18 in FIG. 1). Next, in step 56, the host adapter accesses the cache index directory 14 to determine whether the data element being accessed is in the cache memory, and if so, the address of the data element in the cache memory, and if not, to determine whether a stage operation is in progress for the data element. In step 57, execution branches to steps in FIG. 5 if the data element is not in the cache memory.

If in step 57 the host adapter finds that the requested data element is in the cache memory, then in step 62 the host adapter reads or writes to the data element in the cache memory. Next, in step 63, execution branches to step 64 if the data access command performs a write operation. In step 64, the host adapter updates the cache index directory 14, the replacement queue 31, and the pending write data structure 32 for the storage device containing the data element. In particular, a "modify" flag in the cache directory entry for the data element is inspected to determine whether the data element in cache has already been modified but not yet written back to a storage device. If the modify flag is not set, indicating that the data has not been modified and not yet written back, then the modify flag is set, the entry in the replacement queue is removed from the replacement queue, and a write-back request is inserted in the pending write data structure for the storage device containing the data element.

If the modify flag is set, then it is not necessary to change the replacement queue, nor is it necessary to change the modify flag. However, if the modify flag is not reset until after the device controller acknowledges completion of a write-back operation, then it may or may not be necessary to insert a write-back request in the pending write data structure for the storage device containing the data element, depending on whether or not a write-back request for the data item is already in the pending write data structure. If there already is a write-back request in the pending write data structure, then another need not be inserted. However, if there is not already a write-back request in the pending write data structure, one must be inserted because the device controller is in the process of writing-back data that has not been modified by the host command presently being processed by the host adapter. To indicate whether or not a write-back request for any data element is a pending write, the directory entry of a data item has a write pending flag that is set each time that a write-back request for the data element is placed in the pending write data structure and reset when the host adapter removes the write-back request for the data element from the pending write data structure.

If in step 63 the host command does not specify a write operation, then in step 65 the replacement queue 31 is updated. The conventional method of updating the replacement queue in step 65 would be to remove the entry for the data element being accessed from the replacement queue and insert that entry at the tail of the queue. However, such a method of updating the replacement queue requires a good deal of computing time, and therefore a modified technique is used to update the replacement queue, as will be further described below.

After step 64 or step 65, execution continues in step 66. In step 66, the host adapter releases access to the bus 18. Then in step 67 the host adapter sends to the host data read from the cache memory, in order to complete the processing of a read command, or an acknowledgment of completion, in order to complete the processing of a write command.

Returning now to step 51, if the host adapter becomes aware of the completion of a staging operation, then execution by the host adapter branches from step 51 to step 68. In step 68, the host adapter requests and obtains access to the system bus 18. In step 69, the host adapter removes all stage completion messages from its respective stage completion data structure and transfers them into a data structure in memory local to the host adapter. In step 70, the system bus 18 is released by the host adapter. In step 71, the host adapter processes all of the suspended host commands that are waiting for the data elements identified by the stage completion messages, and these stage completion messages are removed from the data structure in the memory local to the host adapter. Then execution returns to step 51.

Figure 5:
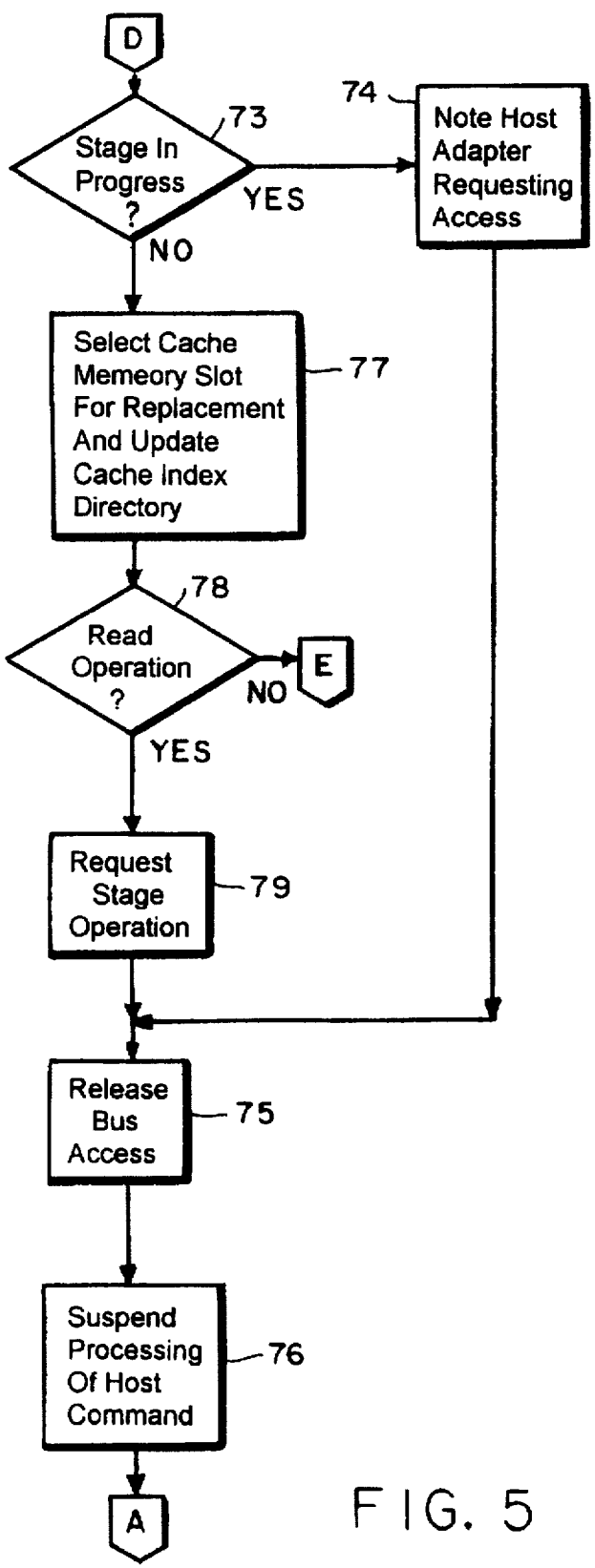
FIG. 5 is a second portion of the flowchart of the cache management procedure executed by each host adapter in the data storage system of FIG. 1.

Turning now to FIG. 5, in step 73, the processor branches to step 74 if a stage operation is already in progress. A stage operation is already in progress if the cache index directory indicates that a cache memory slot has been allocated to the data element but a flag in the directory entry indicates that a stage operation is in progress. If so, then the current host command should be suspended until the stage operation has been completed. To signal the host once the stage operation has been completed, in step 74 a record is made that the host adapter requested access to the data element. For example, the directory entry has a flag for each processor that is set to indicate whether or not each processor should be signaled once the stage operation has been completed. Next, in step 75, the host adapter releases access to the system bus, and in step 76, processing of the host command is suspended. The processing of the host command is suspended, for example, by inserting the suspended host command into a wait queue 38.

In step 73 it was found that a stage operation was not in progress, then in step 77 a cache memory slot is allocated to the data element by selecting one of the slots in the replacement queue and updating the cache index directory to associate the address of the data element with the selected cache memory slots. For a non-sequential process, the data element at the head of the replacement queue is selected. For a sequential process, it is sometimes desirable to select some other cache slot in the replacement queue, as will be further described below. Then, in step 78, execution branches to step 62 of FIG. 4 if the host command is not a read operation (i.e., it is a write-only operation). For such a host command, it is not necessary to stage the data element from a storage device. Otherwise, execution continues from step 78 to step 79. In step 79, the host adapter requests a stage operation by inserting a stage request message into the stage request data structure for the storage device containing the data element. After step 79, in step 75, the host adapter releases access to the system bus 18. Then, in step 76, processing of the host command is suspend, and execution returns to step 51.

Figure 6:
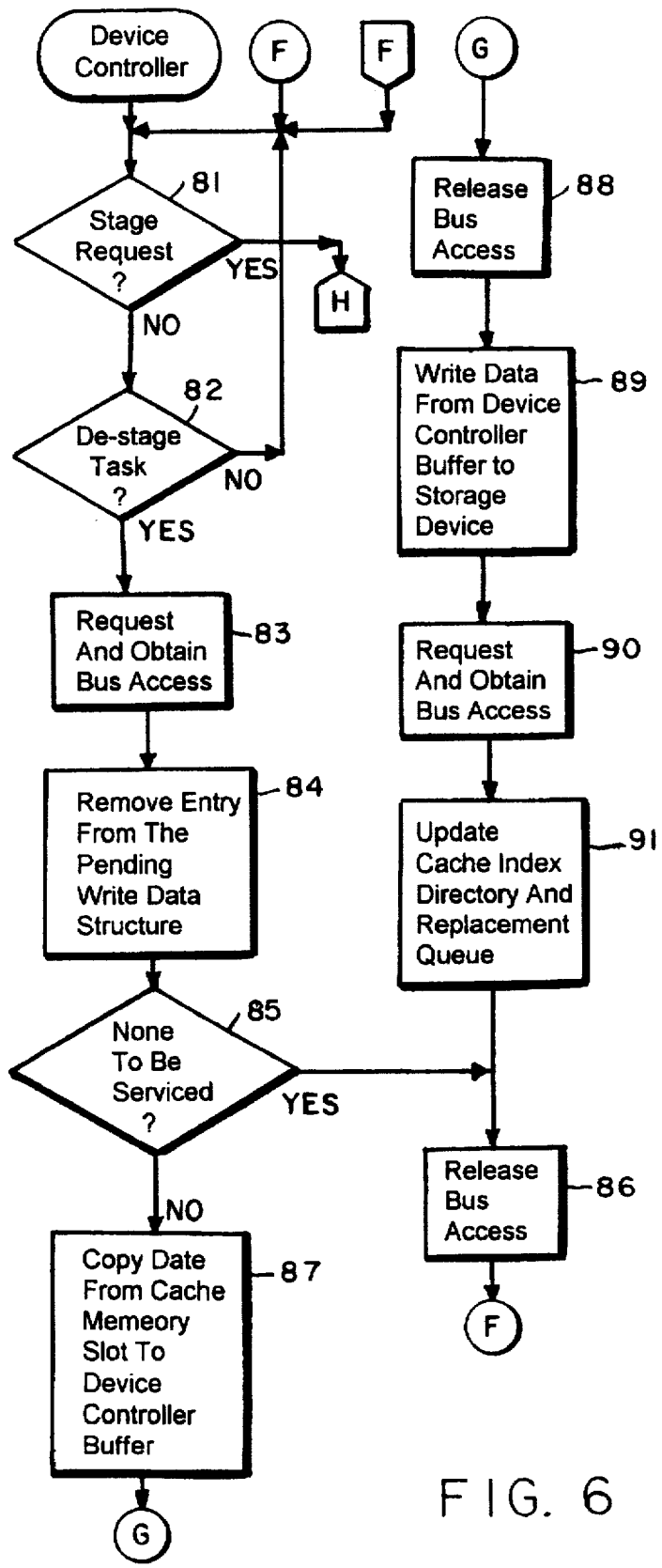
FIG. 6 is a first portion of a flowchart of a cache management procedure executed by each device controller in the data storage system of FIG. 1.

Turning now to FIG. 6, there is shown a flowchart of the cache manager program executed by the device controllers. The cache manager program performs stage tasks and de-stage tasks. Normally the stage task is a priority task and the de-stage task is a background task. However, it is desirable to elevate the de-stage task to a priority task for servicing pending writes when a large number of such pending write requests exist. For example, the device controller executes a high-priority timer-driven interrupt procedure for periodically checking the number of write-back requests in each of the pending write data structures that it services, and for servicing each pending write data structure found to have a number of write-back requests exceeding a certain threshold.

Figure 7:
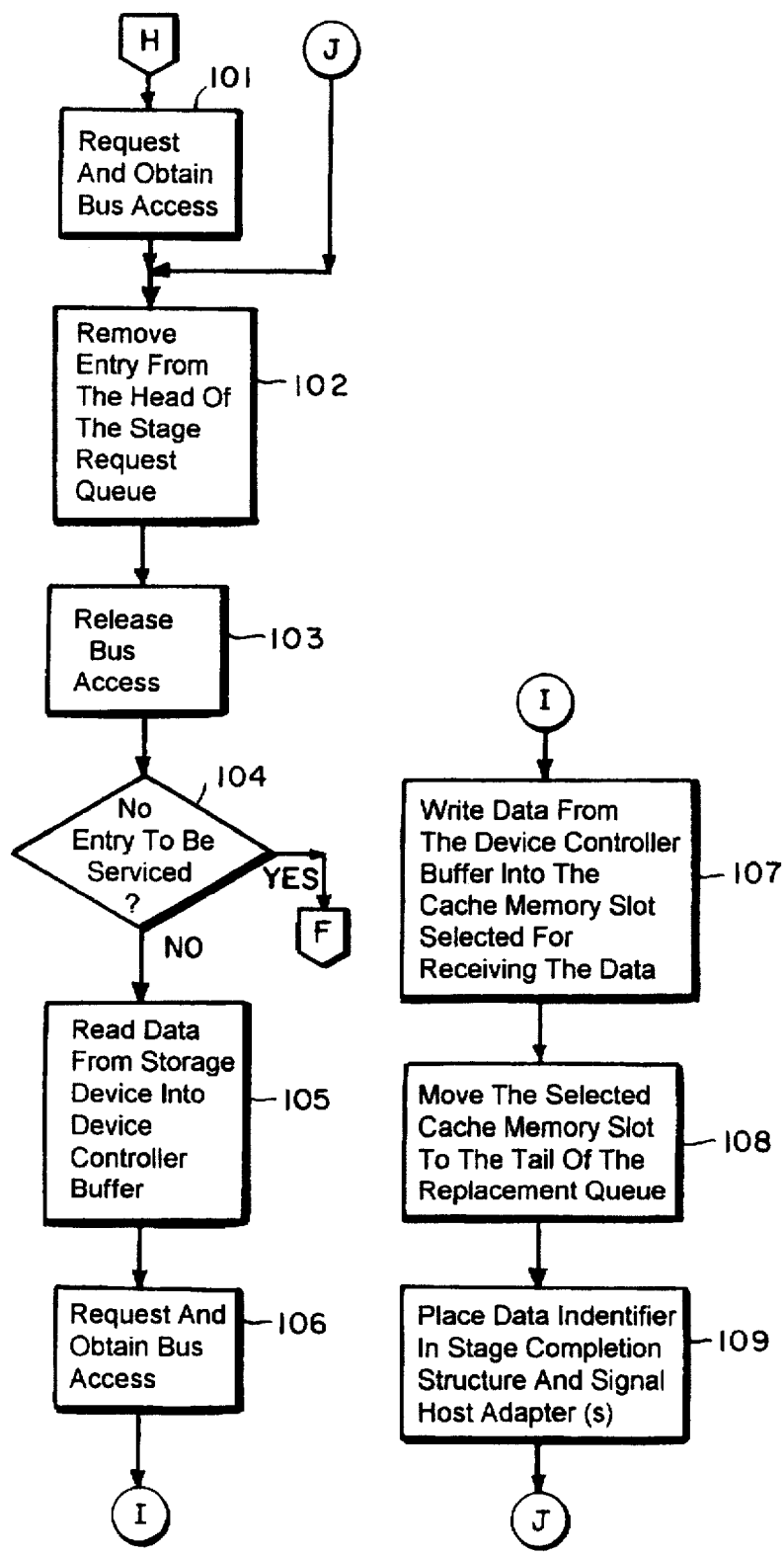
FIG. 7 is a second portion of a flowchart of a cache management procedure executed by each device controller in the data storage system of FIG. 1.

In step 81 of FIG. 6, execution branches to FIG. 7 in response to the host adapter requesting a stage operation. Otherwise, execution continues to step 82. In step 82, execution loops back to step 81 unless a de-stage task should be performed. A de-stage task is typically performed as a background operation whenever there is not an outstanding stage request to the device controllers performing the destaging operation. A de-stage task is performed as a high priority process at periodic times, when the timer-driven interrupt procedure finds that a pending write structure serviced by the device controller has more than a certain number of write-back requests, and the de-stage task continues to have priority until the number of write-back requests in the pending write data structure is reduced to a certain number.

A de-stage task is performed in steps 83 to 91 of FIG. 6. In step 83, the device controller requests and obtains access to the system bus. Then in step 84, the device controller removes a write-back request from the pending write data structure and resets the "in-queue" flag in the cache directory entry for the data element. However, if the pending write data structure is found to be empty, as tested in step 85, then execution branches to step 86. In step 86, the device controller releases bus access, completing the de-stage task, and execution loops back to step 81.

If a write-back request is removed from the pending write data structure, then in step 87 data is copied from the cache memory slot identified by the write-back request to a device controller buffer which is in memory local to the device controller. In step 88, the device controller releases access to the system bus. In step 89, the device controller writes the data from the device controller buffer to the storage device. In step 90, the device controller requests and obtains access to the system bus. Then in step 91, the device controller updates the cache index directory and the replacement queue. This is done by resetting the "modify" flag in the directory entry for the cache slot unless the pending write has another write-back request for the same data element, as indicated by the "in-queue" flag in the directory entry. The replacement queue could be updated in a conventional fashion by placing the cache slot of the data element at the tail of the replacement queue, although a preferred method for updating the replacement queue will be described below with reference to FIG. 14. Execution continues to step 86, where the device controller releases access to the system bus, and execution loops back to step 81.

Turning now to FIG. 7, the device controller begins a stage operation in step 101 by requesting and obtaining access to the system bus. Then in step 102, the device controller removes the stage request message in the stage request data structure. Next, in step 103, the device controller releases its access to the system bus. In step 104, execution loops back to step 104 if the stage request data structure was found to be empty in step 102. This is not necessarily an error condition, because it is possible that more than one of the device controllers might be servicing the same stage request data structure, and the stage request data structure might be empty because it was just serviced by another device controller.

If the stage request data structure was not found to be empty in step 104, then execution continues from step 104 to step 105. In step 105, the device controller reads the requested data element from the storage device into the device controller buffer. Then in step 106, the device controller requests and obtains access to the system bus. In step 107, the device controller writes the data element from its buffer into the cache slot having been selected for receiving the data element. In step 108, the device controller moves the selected cache memory slot to the tail of the replacement queue. Finally, in step 109, the device controller inserts an identifier of the staged data element into the stage completion data structure for the host adapters.

2. Modification of the Least-Recently-Used Cache Replacement Procedure Based on Time-Stamping of Cache Entries and Monitoring of the Frequency of Access to Data Elements in the Cache A problem with a shared cache in a multi-processor-based storage system as shown in FIG. 1 is that the overall processing time for cache management in a "high load" situation is increased greatly by each processor waiting for access to the shared system memory 13. If a conventional least-recently-used cache replacement procedure were used, then each time a data element in the cache memory 12 is accessed by a host adapter 15a, 15b, the host adapter must obtain access to the shared system memory 13, and then service the replacement queue 31 by un-linking the queue entry for the cache memory slot of the accessed data item, and re-linking the queue entry to the tail of the replacement queue. In a "high load" situation, however, much more time is spent by the host adapter waiting for access to the shared system memory 13. For example, the time for a processor to actually service the replacement queue once access is granted is on the order of 100 microseconds but in a "high load" situation, the overall time for the processor to request and wait for access, to be granted access and then service the replacement queue, is on the order of 300 microseconds. Consequently, the overall time for a processor to service the replacement queue 31 can be substantially decreased by any modification to the cache replacement procedure that will save some time in servicing the replacement queue.

To substantially decrease the overall time for a processor to perform cache management in a "high load" situation, the storage system 10 of FIG. 1 uses a modified least-recently-used replacement procedure for servicing the replacement queue 31 in response to a data access by a host. In particular, the replacement queue is serviced using this modified replacement procedure in step 64 of FIG. 4. According to a first aspect of this modified replacement procedure, a time stamp is stored in the system memory 13 in association with each data element stored in the cache memory 12. The time stamp, for example, indicates in real or relative time when a non-write-pending data element was promoted to the tail of the replacement queue 31 (the most-recently-used position). Preferably, the time stamp is also updated every time that a write-pending data element is accessed. The time stamp can be stored in the directory entry in the cache index directory 14, or in the cache block or slot in the cache memory 12 for the data element, or in a separate array or table indexed by the cache memory slot number.

When a host adapter 15a, 15b accesses a non write-pending data element in the cache memory 12 in step 65 of FIG. 4, the host adapter reads the time stamp to determine the amount of time since the data element was last promoted to the tail of the replacement queue 31, and compares this amount of time to a threshold to determine whether or not the replacement queue should be serviced by promoting the data element to the tail of the queue 31. In particular, the threshold is a predetermined fraction (such as 50%) of the average "fall-through" time for a data element to be replaced in the cache memory 12 since it was last promoted to the tail of the replacement queue 31. If the amount of time that a data element has resided in the replacement queue 31 since it was last promoted to the tail of the queue is less than the predetermined fraction of the average fall-through time, then the replacement queue 31 is not serviced. Otherwise, the replacement queue 31 is serviced by moving the accessed data element to the tail of the queue.

Figure 8:
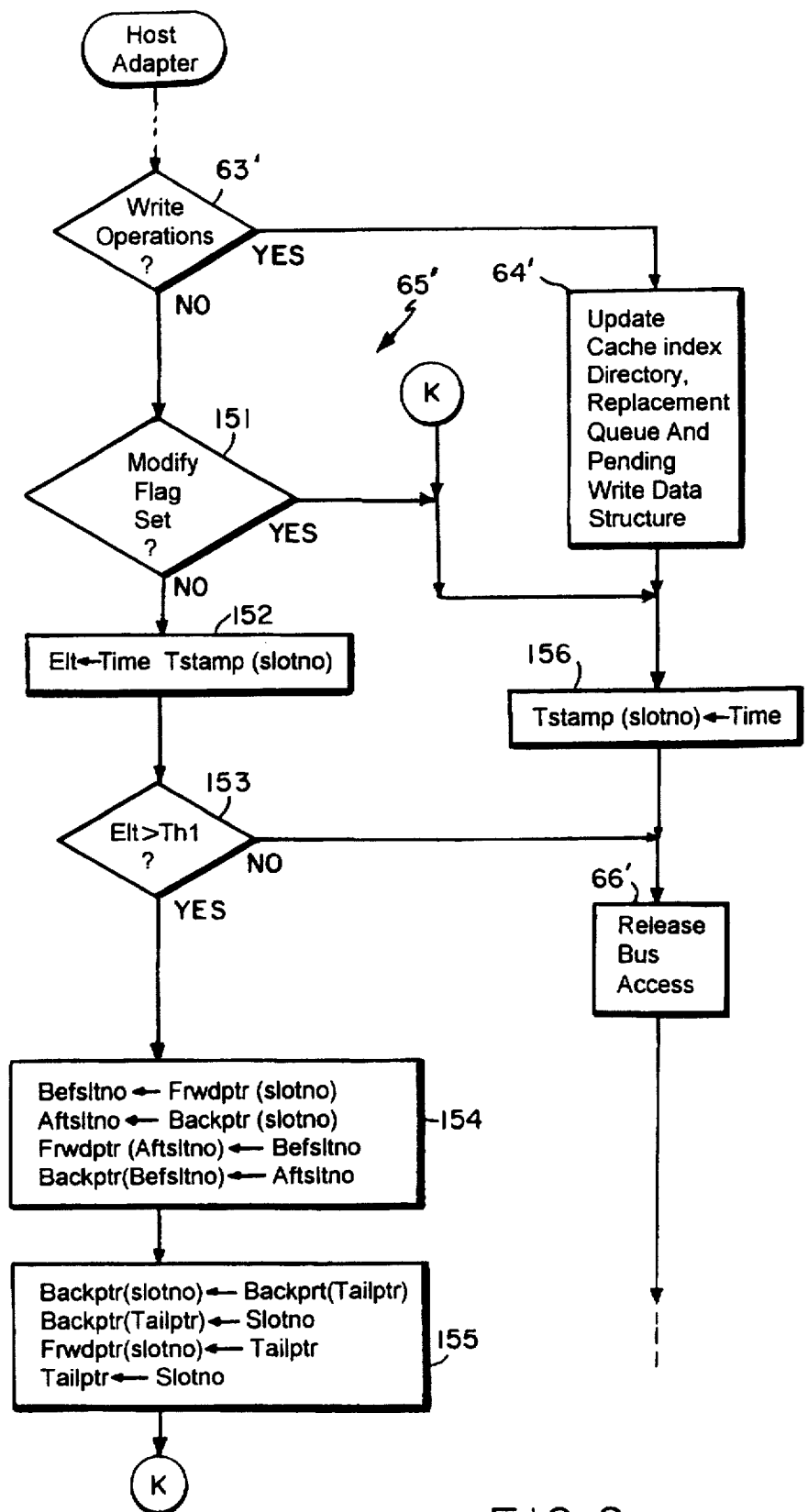
FIG. 8 is a flowchart of modifications in and around a step 65 of FIG. 4 of the cache manager program of each host adapter for performing a modified least-recently-used replacement procedure.

Turning now to FIG. 8, there is shown a flowchart of modifications in the cache manager program of the host adapter for performing the modified least-recently-used replacement procedure. These modifications are made in and around step 65 of FIG. 4. Steps in FIG. 8 that are similar to steps in FIG. 4 are designated with similar but primed reference numerals. In step 151, the host adapter checks the modify flag in the cache directory entry for the accessed data element to determine whether the access is to a non-write-pending data element. If so, then the replacement queue need not be updated because the data element is not in the replacement queue. Otherwise, execution continues to step 152, where the host adapter computes the mount of time (ELT) since the data element was last promoted to the tail of the replacement queue 31. The time stamps are stored in an array TSTAMP indexed by cache slot number. The cache slot number of the cache memory slot containing the accessed data element is SLOTNO. TIME is the real or relative time given by a clock in the data storage system 10 of FIG. 1.

In step 153, the host adapter compares the amount of time (ELT) to a threshold (TH1) to determine whether or not the replacement queue should be serviced by promoting the data element to the tail of the queue. If the threshold is not exceeded, then the replacement queue is not serviced. Otherwise, if the threshold is exceeded, then execution continues to step 154 where the cache memory slot of the data element is removed from the replacement queue, and to step 155 where the cache memory slot of the data element is inserted at the tail of the queue. In steps 154 and 155 as shown in FIG. 8, the forward pointers and the tail pointer TAILPTR are in an array FRWDPTR indexed by the cache slot number. The backward pointers and the head pointer are in an array BACKPTR indexed by the cache slot number.

In the flowchart of FIG. 8, the time stamp (TSTAMP) for the accessed data element is updated in step 156. Step 156 is performed for a write operation, for an access to a write-pending data element, and when the data element is promoted to the tail of the replacement queue in steps 154 and 155. The time stamp for the accessed data element is not updated when the elapsed time ELT does not exceed the threshold TH1 in step 153. The time stamp for a data element should also be updated when the data element is staged to the cache memory from a storage device, for example in step 108 of FIG. 7.

In effect, the comparison of the elapsed time ELT to the threshold TH1 in step 153 attempts to estimate the relative position of the data element in the replacement queue 31. To gain a performance improvement, the data element should not be promoted to the tail of the replacement queue 31 if it is unlikely that the data element will be replaced in the near future. In other words, the data element should be promoted to the tail of the replacement queue 31 only if it is relatively close to the head of the queue. The time that the data element has resided in the replacement queue 31 since it has been last promoted to the tail of the queue is an indication of the relative distance in the queue from the tail of the queue to the data item. The average fall-through time is an estimate of the relative distance in the queue 31 from the tail of the queue to the head of the queue. The average fall-through time, however, might not be a good estimate if there is a relatively large variance.

In practice, the variance of the average fall-through time is dependent on variations in the rate of data access, and on the percentage of write operations. A higher rate of data access tends to decrease the fall-through time and increase the variance of the fall-through time, and a higher percentage of write operations also tends to decrease the fall-through time and increase the variance of the fall-through time. In general, when the average fall-through time increases, the data element can be kept in the cache for a greater fraction of the average fall-through time without a significant chance of the data element being replaced due to the variance of the fall-through time.

In a specific embodiment, the average fall-through time is compared to a predetermined duration of time to determine whether or not the cache is "stressed". If the cache is "stressed," the threshold is a lower fraction (such as 50%) of the average fall-through time, and if cache is not "stressed," the threshold is a higher fraction (such as 75%) of the average fall-through time. The cache is "stressed" if it is burdened to the degree that performance of the data storage system is severely limited by the capacity of the cache memory. If the average fall-through time is less than 10 minutes, for example, the cache is stressed. The predetermined duration of time, however, should be dependent on the capabilities of the particular data storage system (such as the size of the cache) and to a lesser extent the kinds of processes that access the data storage system (for example, whether the processes are primarily reads, primarily read-modify-writes, or primarily sequential). In another embodiment, the predetermined duration of time can be selected by performing measurements of the response time of the data storage system to data access requests of typical processes as a function of the number of accesses per unit time, and when the performance becomes impaired by a high rate of access, by measuring the average fall-through time.

According to another aspect of the invention, the time stamps associated with the data elements in the cache memory are also used to dynamically compute the average fall-through time. The average fall-through time is computed over a relatively large number of data elements having been replaced in the replacement queue 31. Preferably, the average fall-through time is re-computed each time that a data element is replaced in the replacement queue. This computation, for example, is performed by the host adapters in FIG. 5 after step 77 and before step 78. To perform this computation, the cache manager program of the host adapters has a kind of digital low-pass filter routine that re-computes the average fall-through time from the fall-through time of the data element that is selected for replacement in step 77 of FIG. 5.

Figure 9:
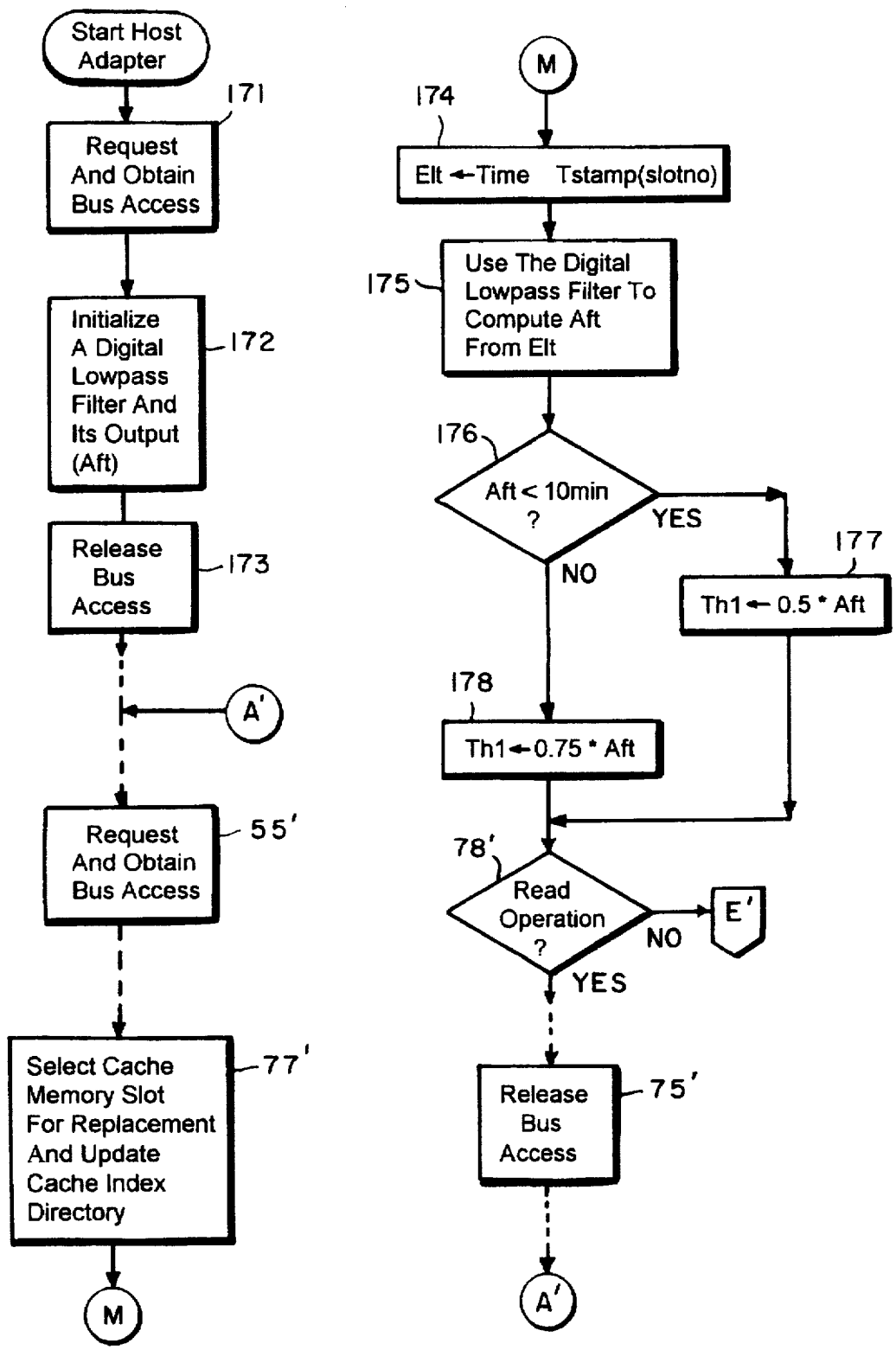
FIG. 9 is a flowchart of a procedure in the cache manager program of each host adapter for computing average fall-through time of a data element through the cache.

Turning now to FIG. 9, there is shown a flowchart that illustrates the computation of the average fall-through time in the cache manager program of the host adapters. Steps in FIG. 9 that are similar to the steps in FIG. 5 are designated with similar but primed reference numerals.

The digital low-pass filter routine requires certain state information to be initialized. Since it is desirable to distribute the digital low-pass filter operations among all of the channel adapters, this state information is stored in the shared memory. To initialize the state information when the storage system is installed and powered-up or reset, in a first step 171 the channel adapter requests and obtains access to the system bus. Then in step 172, the state information of the digital lowpass filter and its output (AFT) are initialized to provide an initial minimum value of the average fall-through time. For example, the initial minimum value of the average fall-through time can be [zero] two minutes. Then in step 173, the host adapter releases its access to the system bus.

In step 55', the host adapter requests and obtains access to the system bus in order to perform a data access operation. If the data element to be accessed does not reside in the cache, then in step 77' the host adapter selects a cache memory slot for replacement, and updates the cache index directory, as explained above with reference to step 77 in FIG. 5. In step 174, the fall-through time (ELT) of a data element being replaced in the cache is computed from the time-stamp stored in the shared memory for this data element. Then in step 175, a digital low-pass filter routine computes the average fall-through time (AFT) from the fall-through time (ELT) of the data element being replaced in the cache. In step 176, the average fall-through time (AFT) is compared to 10 minutes to determine whether or not the cache is stressed. If the average fall-through time (AFT) is less than ten minutes, then the cache is considered to be stressed, and execution branches to step 177. In step 177, the host adapter computes the threshold TH1 as one-half of the average fall-through time (AFT). If the average fall-through time (AFT) is not less than ten minutes, then the cache is not considered to be stressed, and execution continues from step 176 to step 178, where the host adapter computes the threshold TH1 as three-quarters of the average fall-through time. After steps 177 or 178, execution continues to step 78', where execution branches depending on whether the host command being processed is not a read operation, as explained above with reference to step 78 of FIG. 5. If the host command being processed is a read operation, then execution continues from step 78' to step 75', where the host adapter releases its access to the system bus, as explained above with reference to step 75' of FIG. 5.

Figure 10:
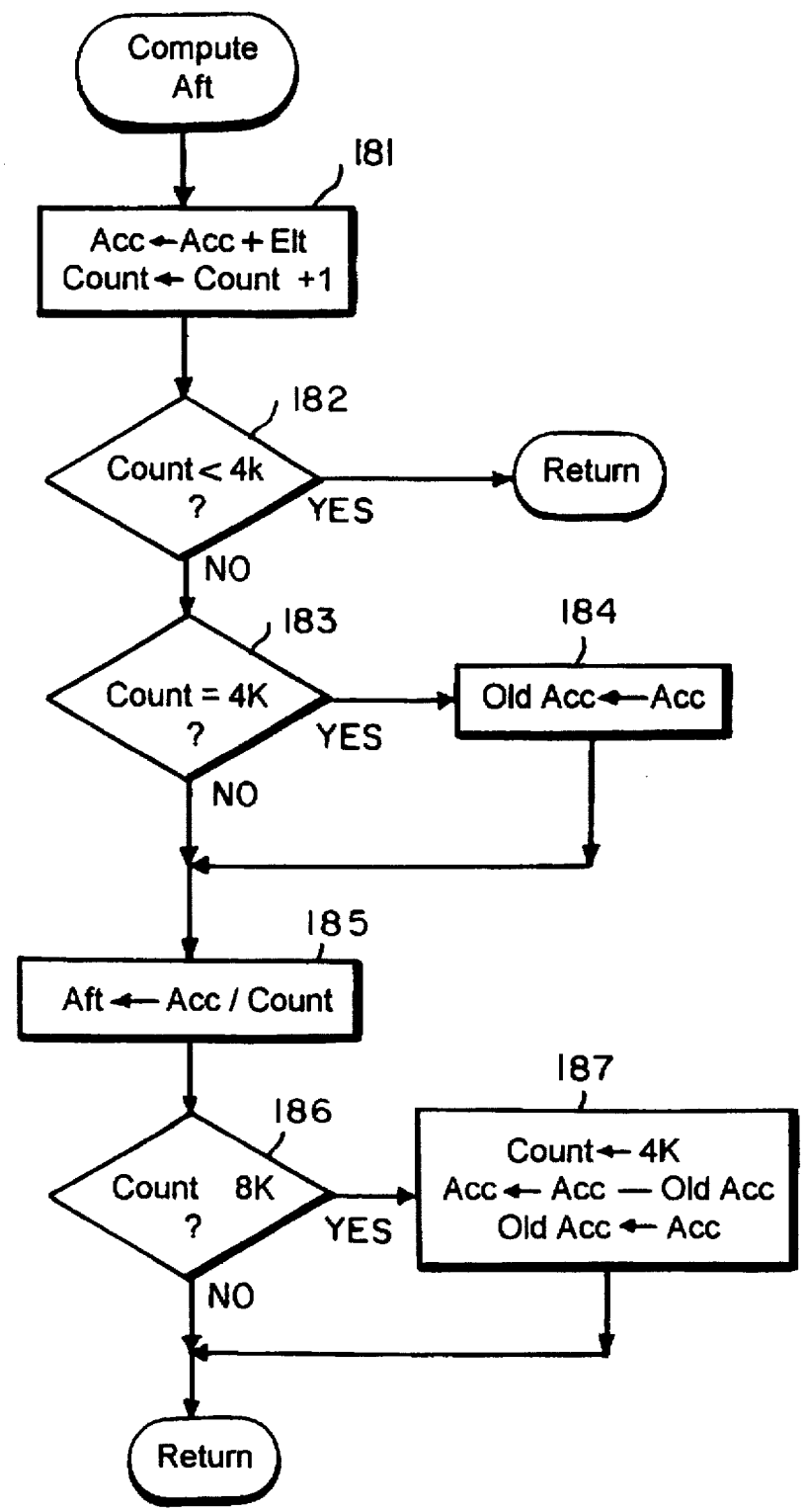
FIG. 10 is a flowchart of a digital lowpass filter routine used in the procedure of FIG. 9 for computing the average fall-through time.

Turning now to FIG. 10, there is shown a flowchart of the preferred digital lowpass filter routine for step 175 of FIG. 9. This digital lowpass filter routine computes the average fall-through time (AFT) over 4K (4,096 decimal) to 8K (8,192 decimal) data elements. The state information for this digital filter includes an accumulated value (ACC) and a count value (COUNT).

In the first step 181, the accumulator (ACC) is increased by the fall-through time (ELT). The counter (COUNT) is also incremented in Step 181. If the value of the counter is less than 4K, as tested in step 182, the digital filter routine is finished. Otherwise, when the value of the counter reaches 4K, as tested in step 183, the content of the accumulator is saved in another memory location (OLDACC) in step 184. When the value of the counter is greater or equal to 4K, the average fall-through time is computed in step 185 by dividing the value of the accumulator by the value of the counter. If the value of the counter reaches 8K, as tested in step 186, then in step 187 the value of the counter is reset to 4K, the value of the accumulator is decreased by the value (OLDACC) saved in memory, and the value saved in memory is set to the decreased value of the accumulator.

In accordance with another aspect of the invention, the modified least-recently-used replacement procedure takes into consideration a usage count associated with each data element in the cache memory. The usage count, for example, is stored in the directory entry or in the cache memory slot for the data element, or in an array or table indexed by the cache slot number. The usage count indicates the number of times that each data element in the cache memory has been accessed by a host. When a data element is fetched from storage and staged into the cache, its usage count is reset to zero. Each time that a host accesses a data element in the cache, its usage count is incremented by one.

Figures 11, 12:
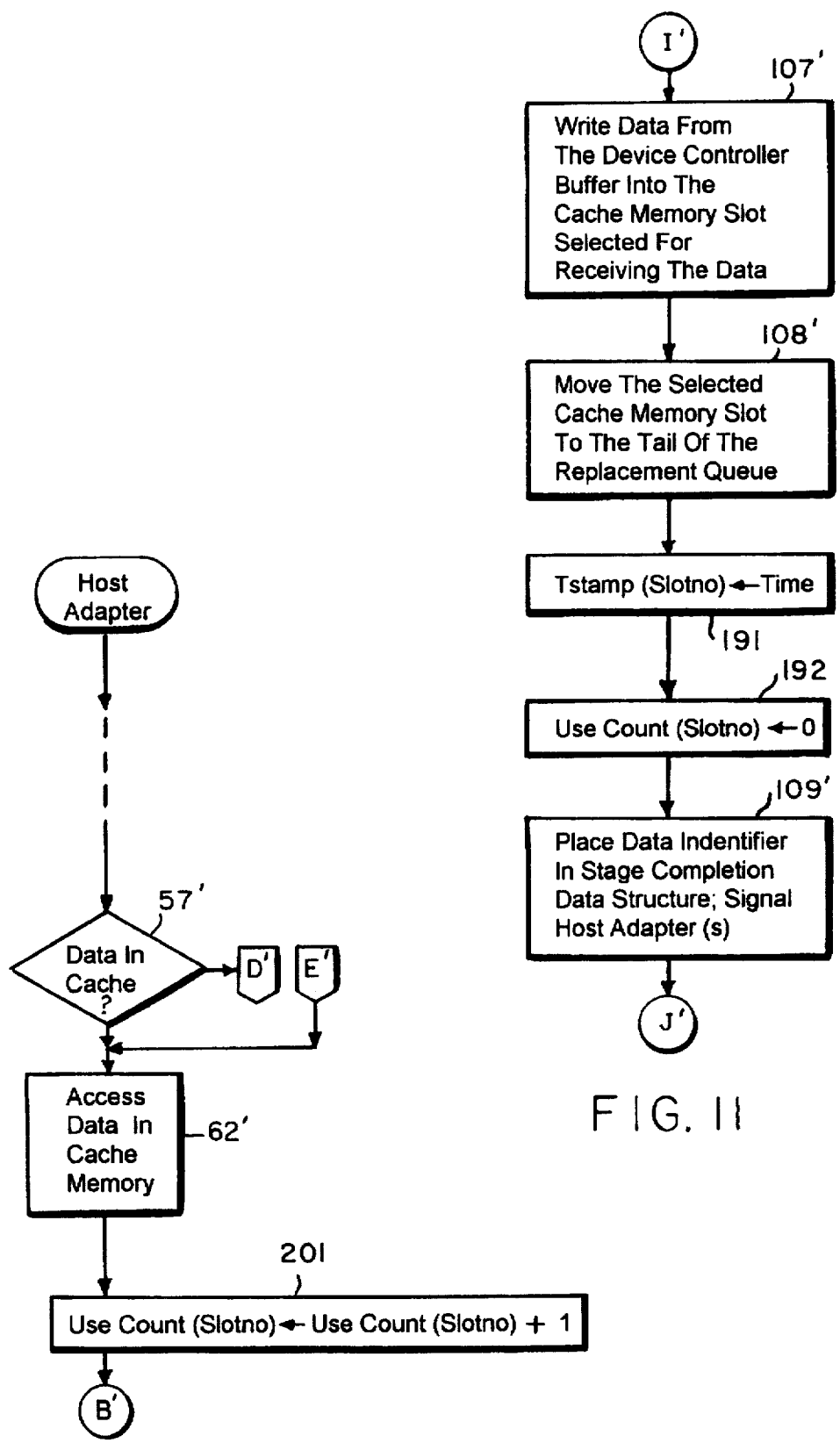
FIG. 11 is a flowchart of modifications to the device controller cache manager program of FIG. 7 for initializing a time stamp and a usage count associated with a data element being fetched from a data storage device and staged into the cache.
FIG. 12 is a flowchart of modifications to the host adapter program of FIG. 4 for incrementing the usage count by one each time that a host accesses a data element in the cache.

Turning to FIG. 11, there are shown modifications to the device controller cache manager program of FIG. 7 for initializing the time stamp and the usage count associated with a data element being fetched from a data storage device and staged into the cache. Steps in FIG. 11 that are similar to steps in FIG. 7 are designated with similar but primed reference numerals. As shown in step 191 of FIG. 11, the device controller initializes the time stamp (TSTAMP) of the cache memory slot (SLOTNO) that has been allocated to the data element being fetched and staged into the cache. The device controller initializes this time stamp by setting it to the current time (TIME) indicated by the clock in the data storage system. As shown in step 192 of FIG. 11, the device controller resets the usage count (USECOUNT) to zero.

In some data storage systems, if a host requests access to a data element not present in the cache memory, then the host can access the data element directly from storage without the data element first being written to the cache memory. In such a data storage system, the cache manager may nevertheless stage the data element from storage to the cache during or shortly after the data element is accessed by the host. In this case, the usage count associated with the data element would be reset to an initial value of 1 in step 192 of FIG. 11 when the data element is staged into the cache.

Turning now to FIG. 12, there are shown modifications to the host adapter program of FIG. 4 for incrementing the usage count by one each time that the host accesses a data element in the cache. Steps in FIG. 12 that are similar to steps in FIG. 4 are denoted by similar but primed reference numerals. In step 62', the host adapter accesses a data element in the cache. Then, in step 201, the host adapter increments by one the usage count of the cache memory slot number associated with the data element. In accordance with another aspect of the invention, the another aspect of the invention, the frequency of access to the data elements in the cache memory is used to control the modified least-recently-used replacement procedure. For example, when a data element reaches the head of the replacement queue 31, the usage count for the data element is compared to a threshold. If the count exceeds the threshold, then the data element is moved to the tail of the replacement queue 31 (i.e., a most-recently-used position), and the count is decreased.

Figure 13:
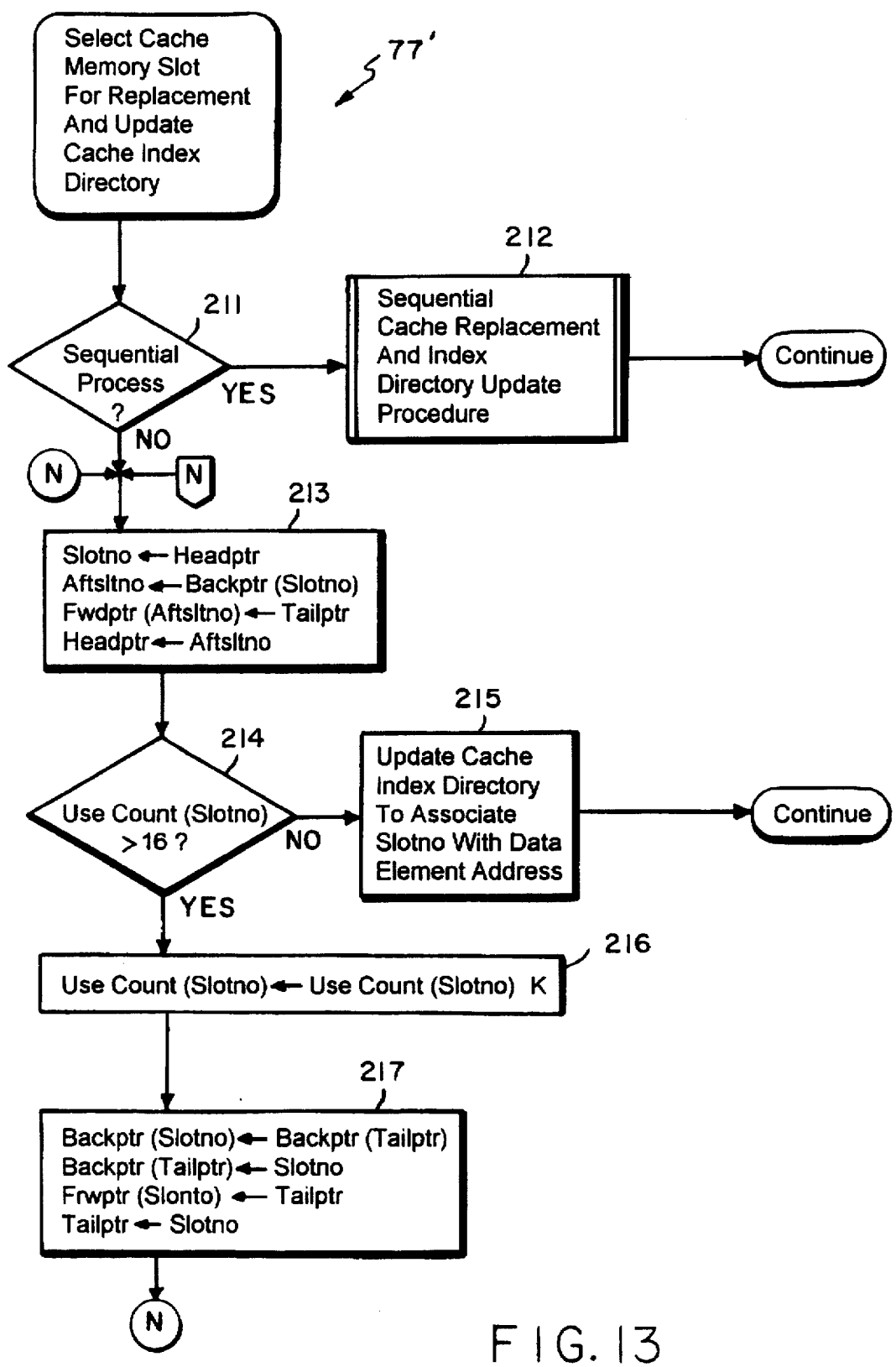
FIG. 13 is a flowchart of a procedure for carrying out a step 77 of FIG. 5 so that the frequency of access to the data elements in the cache memory is used to control the modified least-recently-used procedure.

Turning now to FIG. 13, there is shown a flowchart of a procedure 77' for carrying out step 77 of FIG. 5 so that the frequency of access to the data elements in the cache memory is used to control the modified least-recently-used procedure. The procedure 77' is performed by the host adapter when the host adapter selects a replacement cache slot for staging a data element from a storage device into the cache memory. In a first step 211, execution branches to step 212 if the data element is being fetched for a sequential process. The host adapter is either informed by the host that the data element is being fetched by a sequential process, or the host detects the occurrence of a sequential process. The host, for example, could inform the host adapter of a sequential process by issuing a sequential data access command specifying an initial address, a stride, and a certain number of data elements of a storage device to be accessed. The sequential data access command would be processed by sequentially computing data element addresses, where the stride is the increment in the address between successive data elements, and staging each addressed data element from the storage device to the cache memory. Alternatively, the host adapter may monitor the data access commands received from a host processor, detect whether successive commands access data of the same data storage device such that at least a certain number of the successive commands have addresses spaced by the same stride. This certain number is known as the sequential access threshold. It is desirable for the host adapter to detect the occurrence of a sequential access in order to prefetch the data likely to be requested by the sequential access.

In step 212, the host adapter performs a sequential cache replacement and index directory update procedure that does not necessarily choose for replacement the cache slot at the head of the replacement queue. Instead, step 212 may use a "micro-cache" method of cache management, as described in Yanai et al. U.S. Pat. No. 5,381,539, incorporated herein by reference. Moreover, in step 212, prefereably a decision is made whether or note to use the "micro-cache" method of cache management, as will be further described below with reference to FIG. 15. After step 212, the procedure 77' is finished.

If the data element is not being fetched for a sequential process, then execution continues from step 211 to step 213. In step 213, the cache memory slot at the head of the replacement queue is removed from the replacement queue.

Then in step 214, the usage count associated with the cache slot removed from the replacement queue is compared to a threshold such as sixteen. If the usage count is not greater than sixteen, then execution branches from step 214 to 215. In step 215, the cache index directory is updated to associate the slot number with the address of the data element being fetched. After step 215, the procedure 77' is finished.

If the usage count is greater than sixteen, then execution continues from step 214 to 216. In step 216, the usage count is set to fifteen. Then in step 217 the cache slot having been removed from the replacement queue is inserted at the tail of the replacement queue. After step 217, execution loops back to step 213.

Alternatively, steps 213, 214, 216 and 217 of FIG. 13 could be performed in the data storage system 10 as a background process so as not to delay the fetch operation. In such a background process, any processor in the data storage system could scan a certain number, for example, four cache slots near the head of the replacement queue beginning with the cache slot at the head of the replacement queue. If the usage count for all four cache slots were found to be greater than sixteen, then usage count would be set to fifteen for each cache slot, and the initial cache slot would be selected.

3. Managing Pending Write Operations by Monitoring the Average Time that a Data Element Resides in the Cache In accordance with another aspect of the invention, the pending write operations in the data storage system are managed by monitoring the average time that a data element resides in the cache. As introduced above, when a write operation is pending to a data element in the cache memory, it is conventional to reserve or "lock" the data element until the write operation is completed. The memory locking ensures atomic write operations and data consistency among various processes. The pending write status of the data element is typically indicated by a pending write flag that is set in the directory entry or in the cache block or slot for the data element during the write operation.

In a data storage system having a replacement queue 31 of data elements in a cache, the cache manager can manage pending writes by removing the accessed data element from the queue, writing to the data element, and then returning the accessed data element to the tail of the queue. In this case, a least-recently-used cache replacement procedure would be followed for write as well as read accesses to data elements in the cache memory. However, it is rather inefficient to follow a least-recently-used cache replacement procedure for write accesses, because for many processes, there is a relatively low probability that a write access will be followed by a read or write access to the same data element in the near future. On the other hand, the probability that a write access will be followed by a read or write access to the same data element in the near future is not so low that it would be efficient to always return the data element to the head of the queue 31. Returning the data element to the head of the queue 31 is basically equivalent to removing the data element from the cache, since there is a very high probability that the data element will be replaced in the cache before a next access to the data element. These considerations suggest that one would want to put the data element back in the queue 31 at some intermediate location, but insertion of a data element at an intermediate location would require too much overhead in the cache manager.

In accordance with one aspect of the present invention, after a pending write operation to a data element, the cache manager is responsive to the average fall-through time in order to decide either to return the data element to the head of the queue 31 or to return the data element to the tail of the queue. For example, when the cache manager completes the pending write operation to the data element in step 91 of FIG. 6, the duration of time since the time stamp was last updated prior to the write operation is computed from the value of the time stamp and the current time. This duration of time is compared to a predetermined factor times the average fall-through time, in order to decide either to return the data element to the head of the queue 31 or to return the data element to the tail of the queue. The predetermined factor, for example, has a value of two. For this specific example, if the duration of time is greater than twice the average fall-through time, then the data element is returned to the head of the queue 31, so that it will essentially be discarded from the cache. Otherwise, the data element is returned to the tail of the queue 31.

In accordance with another aspect of the invention, the cache manager may use additional information to control its decision to return the data element to either the head of the queue 31 or the tail of the queue. For example, if the data element were at the head of the queue 31 at the beginning of the pending write operation, then it may always be returned to the head of the queue. The cache manager may also consider the usage count indicating how many times the data element was accessed when it was in the cache. For a pending write operation, in contrast to a read operation, high usage (count >=2) is indicative of a pending write operation that follows a read operation to complete a read-modify-write sequence. Therefore, if the data element for a pending write operation has high usage (count >=2), then the data element is returned to the head of the queue 31. Otherwise, if the data element has low usage (count <=1), then the average time that a data element resides in the cache is compared to the threshold to decide either to return the data element to the head of the queue 31 or to return the data element to the tail of the queue.

Figure 14:
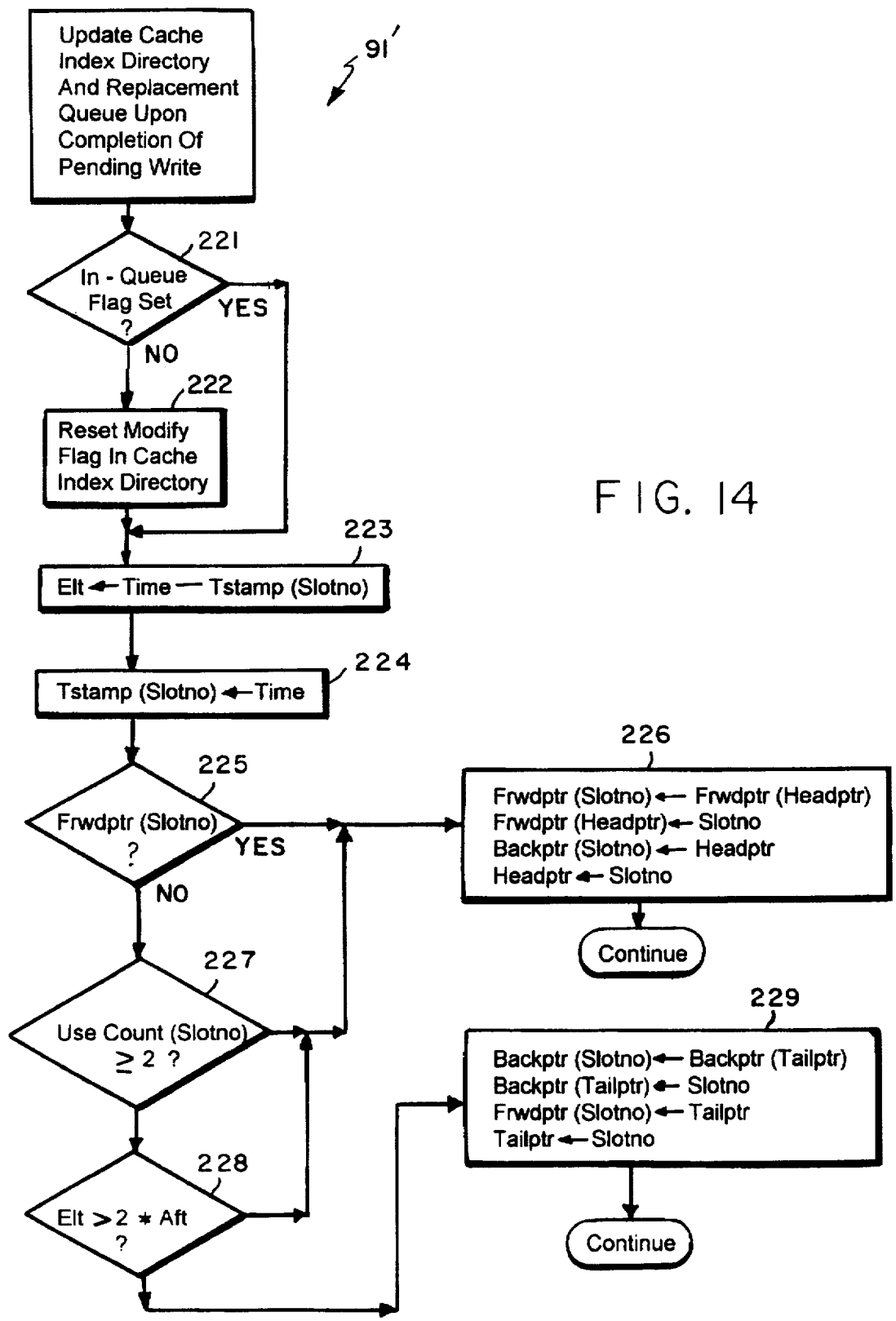
FIG. 14 is a flowchart of a procedure for carrying out a step 91 of FIG. 6 to update the cache index directory and the replacement queue to return a cache slot to either the head of the replacement queue or the tail of the replacement queue upon completion of a pending write operation.

Turning now to FIG. 14, there is shown a flowchart of a procedure 91' executed by the device controllers for carrying out step 91 of FIG. 6 to update the cache index directory and the replacement queue in the fashion described above upon completion of a pending write operation. In a first step 221, the cache index directory is inspected to determine whether the in-queue flag for the data item having been written back is set. If not, then in step 222, the device controller resets the modify flag for the data item in the cache index directory. Execution continues in step 223 after step 222 and also after step 221 if the in-queue flag is found to be set in step 221.

In step 223, the device controller computes the elapsed time (ELT) for the data item as the difference between the current time (TIME) and the time stamp (TSTAMP) for the slot number of the data item being written back. In step 224, the device controller updates the time stamp to the current time.

In step 225, the device controller inspects the forward pointer for the slot number of the data item being written back in order to determine whether the slot had been taken from the head of the replacement queue when it was transferred from the replacement queue to the pending write queue. If this forward pointer points to the head pointer of the replacement queue then the slot had been taken from the head of the replacement queue, and execution branches from step 225 to step 226 where the slot is inserted at the head of the replacement queue. If the forward pointer does not point to the head of the replacement queue, then execution continues from step 225 to step 227.

In step 227, the device controller inspects the usage count of the slot number for the data item being written back, and if the usage count is greater than or equal to two, then execution branches to step 226 where the slot is inserted at the head of the replacement queue. If the usage count is less than two, then execution continues from step 227 to step 228.

In step 228, the device controller compares the elapsed time (ELT) for the data item to twice the average fall-through time (AFT). If the elapsed time (ELT) is greater than twice the average fall-through time, then execution branches to step 226 where the slot is inserted at the head of the replacement queue. If the elapsed time (ELT) is not greater than twice the average fall-through time, then execution continues from step 228 to step 229 were the slot is inserted at the tail of the replacement queue.

In any case, the procedure 91' is finished after the cache memory slot associated with the data item having been written back is returned to the replacement queue. The cache memory slot is either returned to the head of the queue in step 226, or to the tail of the queue in step 229.

4. Controlling Cache Management in a Data Storage System During Staging for Sequential Access by Monitoring the Average Time that a Data Element Resides in the Cache and the Frequency of Access to the Data Elements in the Cache As described above, in a data storage system employing a cache memory and disc storage, it is advantageous to recognize the occurrence of a sequential access, and when a sequential access is recognized, to initiate a prefetch operation and manage a "micro-cache" identifying the cache memory locations storing the data elements of the sequential access. However, this management of the "micro-cache" burdens the cache manager. If the cache is not stressed, this burden on the cache manager does not result in an overall benefit of improved system performance, but instead may increase data access time. If the cache is not stressed, the use of the "micro-cache" may also reduce data access time for host processes that tend to read the same data soon after a sequential access.

In accordance with one aspect of the present invention, the average fall-through time is compared to a threshold indicative of stress on the cache, in order to control the cache management associated with staging for a sequential process. For example, a threshold of five minutes is used, which indicates whether or not the cache is stressed.

In accordance with a specific aspect of the invention, if the cache is not stressed, then the "micro-cache" method of cache management is not employed for the staging operations. Instead, when the cache is not stressed and a staged data element is placed in the cache, the cache is managed by the "least recently used" or "modified least recently used" procedure described above, in which the data element at the head of the queue 31 of the main cache is replaced from the main cache, if space in the cache is needed for storing the staged data element. When the cache is stressed, then the "micro-cache" method of cache management is employed for staging operations, in which the staged data elements are identified as being in a "micro-cache" for the sequential process, and in which the least-recently-used data element in the "micro-cache" is replaced, if space in the cache is needed for storing a data element fetched by or for the sequential process. This least-recently-used data element in the micro-cache could be identified by maintaining a queue of the data elements in the micro-cache, such as a doubly-linked list of pointers to the data elements in the micro-cache. However, in a typical disc storage system, a sequential access includes an access to a series of tracks having either an increasing or decreasing numerical order of track numbers. The least-recently-used track can be identified by a track number pointer that is incremented or decremented after the track is replaced in the cache. The cache memory location of the track is easily found from the track number pointer by a lookup in the cache directory.

Figure 15:
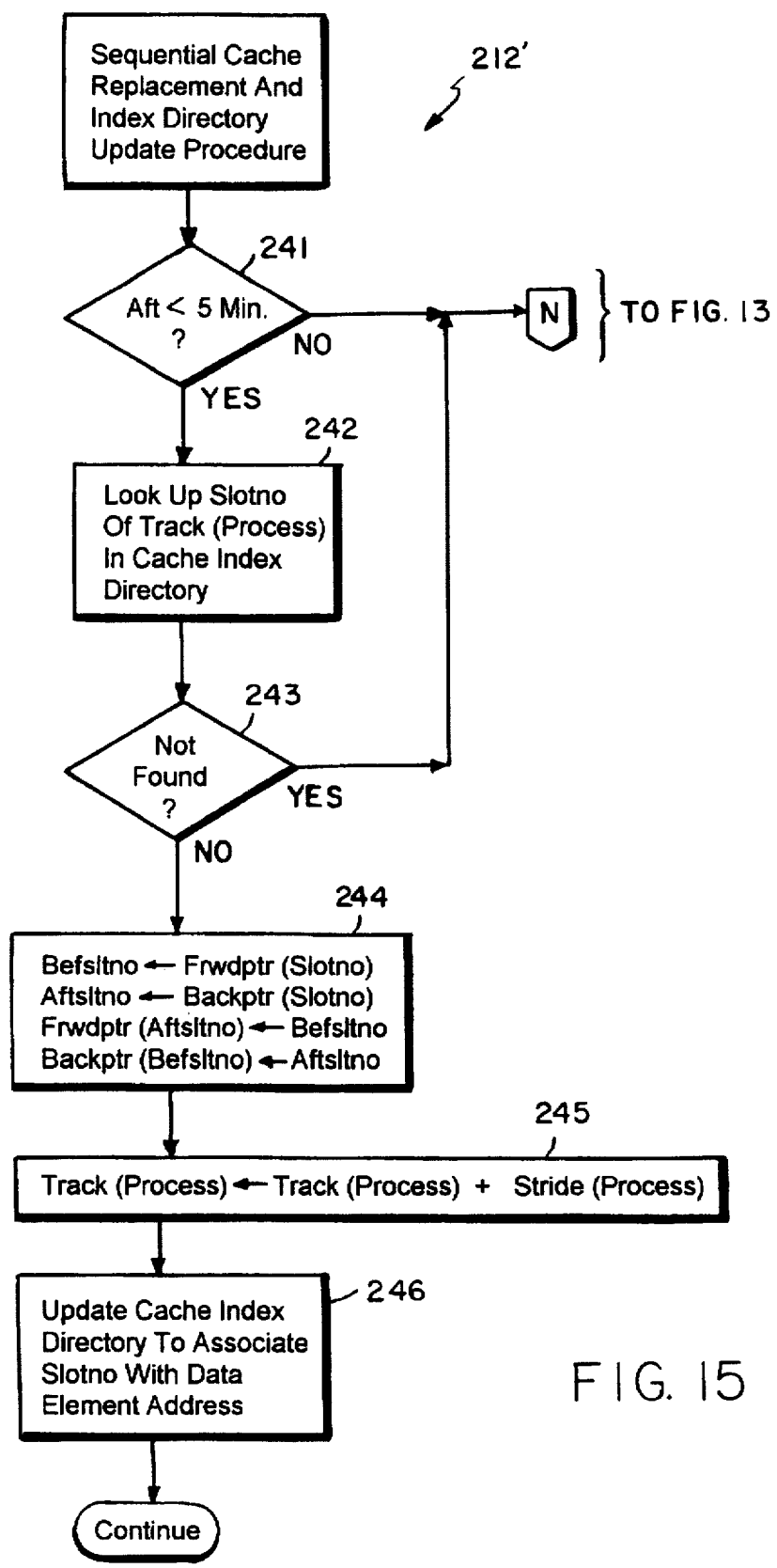
FIG. 15 is a flowchart of a procedure for carrying out a step 212 of FIG. 13 to select a cache memory slot for replacement when it is necessary to stage data requested by a sequential process.

Turning now to FIG. 15, there is shown a flowchart of a procedure 212' executed by the host adapters for carrying out step 212 of FIG. 13 to select a cache memory slot for replacement when it is necessary to stage data requested by a sequential process. It is assumed that when step 212 of FIG. 13 is first reached for a sequential process, the host adapter has already accessed a certain number of data elements for the sequential process. This certain number will be the size of the "micro-cache." It is also assumed that the host adapter has identified a first data element or track that was accessed for the sequential process. A pointer to the least-recently-used data element in the "micro-cache" will be maintained in a variable TRACK(PROCESS), and this variable will be initialized to point to the first data element or track that was accessed for the sequential process. Once this is done, the host adapter will recognize the sequential process in step 211 of FIG. 13.

With reference now to the first step 241 in FIG. 15, the host adapter compares the average fall-through time (AFT) to a predetermined threshold, of for example, five minutes to determine whether the cache is stressed. If the average fall-through time is not less than five minutes, then the cache is not stressed, and execution branches to step 213 of FIG. 13, so that the "micro-cache" method of cache slot replacement is not used. Otherwise, if the average fall-through time is less than five minutes, then the cache is stressed, and execution continues from step 241 to step 242 of FIG. 15.

In step 242 of FIG. 15, the cache index directory is accessed to find the cache slot number (SLOTNO) of the TRACK(PROCESS) data item, which should be the least-recently-used data item in the "micro-cache". Under abnormal circumstances it is possible for this data item to have been cast out of the cache, so in step 243 execution branches to step 213 of FIG. 13 if the cache slot number of the TRACK(PROCESS) data item is absent from the cache. Otherwise, execution continues from step 243 to step 244 of FIG. 15.

In step 244 of FIG. 15, the slot of the TRACK(PROCESS) data item is removed from the replacement queue for use in staging the requested data element to the cache. Then in step 245 the "micro-cache" is effectively serviced by incrementing TRACK(PROCESS) by the stride (STRIDE (PROCESS)) of the sequential access. Finally, in step 246, the cache index directory is updated to associate SLOTNO with the data element address.

Other embodiments are within the spirit and scope of the appended claims.

What is claimed is:

1. In a data storage system, the method for staging data elements in a sequential process comprising the steps of:

identifying a sequential process, creating a microcache within a data replacement queue for storing the data elements provided by the sequential process when the occurrence of a sequential process is identified, comparing the average fall through time for data elements in the replacement queue to a predetermined threshold to determine whether the replacement queue is stressed, if the replacement queue is determined to be stressed, utilizing the microcache for staging all data elements identified by the sequential process; and, if the replacement queue is determined not to be stressed, disregarding utilization of the microcache for staging.

2. The method of claim 1 in which that replacement queue determined to be stressed when the average fall through time is less than a predetermined threshold.

3. The method of claim 2, and further including the step of identifying the least recently used data element in the microcache if the replacement queue is stressed and servicing sequential operations by microcache by replacing the least recently used data element in the microcache.

4. The method as defined in claim 3 and further including the steps of:

servicing the sequential process in the replacement queue if the average fall through time is more than the predetermined threshold.

5. The method as defined in claim 3 and further including the step of:

servicing the sequential process in the replacement queue if the average fall through time is more than the predetermined threshold and the cache slot number of the data element is absent from the cache memory.

6. The method as defined in claim 3 and further including:

establishing the size of the microcache, and incrementing the cache slots within the microcache with the sequential data elements provided by the sequential process.

7. The method as defined in claim 3 and further including:

modifying the established size of the microcache in response to the number of accesses to the data elements in the microcache, and prefetching from said storage devices a plurality of sequential data elements as determined by the stride size of the sequential operation.

8. The method as defined in claim 3 and further including:

updating the cache directory to identify the pointer for the first data element of the sequential process prior to determining the stress on said replacement queue, and modifying the cache directory to identify the pointer for the first data element of the sequential process prior to determining the stress on said replacement queue, and modifying the cache directory to identify a new pointer for the last data element serviced during the sequential operation.

9. A data storage system comprising:

a plurality of host computers and a plurality of data storage devices, a system memory coupled to said host computers and said storage devices for storing data elements provided by said host computers, said system memory comprising;

a cache memory for storing data elements from either the host computers or the data storage devices, a replacement queue within said memory for ordering information stored in said cache memory, said replacement queue further including a microcache for responding to sequential operations, and a cache manager for sensing a sequential operation and for establishing a microcache when a sequential operation occurs, said cache manager sensing when said replacement queue is stressed and servicing said sequential operations from said microcache when said replacement queue is stressed.

10. The system as defined in claim 8 and further including a comparator for comparing the average fall through time of data elements in said replacement cache to a predetermined threshold, said cache manager in response to said comparator indicating said replacement queue is stress replacing data elements on a least recently used basis in said microcache.

* * * * *